US012732921B2

(12) United States Patent
Caporal Del Barrio et al.

(10) Patent No.: US 12,732,921 B2
(45) Date of Patent: Sep. 8, 2026

(54) MAXIMUM PERMISSIBLE EXPOSURE (MPE) UPLINK (UL) BUDGET PRIORITIZATION FOR PHYSICAL UPLINK CONTROL CHANNEL (PUCCH) AND PHYSICAL UPLINK SHARED CHANNEL (PUSCH)

(71) Applicant: NOKIA TECHNOLOGIES OY, Espoo (FI)

(72) Inventors: Samantha Caporal Del Barrio, Aalborg (DK); Simon Svendsen, Aalborg (DK); Sami-Jukka Hakola, Kempele (FI); Benny Gaard, Gistrup (DK); Ahmad Awada, Munich (DE)

(73) Assignee: Nokia Technologies Oy, Espoo (FI)

( * ) Notice: Subject to any disclaimer, the term of this patent is extended or adjusted under 35 U.S.C. 154(b) by 436 days.

(21) Appl. No.: 18/034,946

(22) PCT Filed: Oct. 20, 2021

(86) PCT No.: PCT/EP2021/079074
§ 371 (c)(1),
(2) Date: May 2, 2023

(87) PCT Pub. No.: WO2022/090022
PCT Pub. Date: May 5, 2022

(65) Prior Publication Data

US 2024/0023033 A1 Jan. 18, 2024

Related U.S. Application Data

(60) Provisional application No. 63/108,690, filed on Nov. 2, 2020.

(51) Int. Cl.
*H04W 52/36* (2009.01)
*H04W 52/14* (2009.01)

(52) U.S. Cl.
CPC ....... *H04W 52/367* (2013.01); *H04W 52/146* (2013.01); *H04W 52/365* (2013.01)

(58) Field of Classification Search
CPC ............. H04W 52/367; H04W 52/146; H04W 52/365
See application file for complete search history.

(56) References Cited

U.S. PATENT DOCUMENTS 12,238,721 B2 * 2/2025 Wu ........................ H04W 72/21
2017/0230960 A1 8/2017 Frank
(Continued)

FOREIGN PATENT DOCUMENTS

CN 105491654 A 4/2016
CN 106465291 A 2/2017
(Continued)

OTHER PUBLICATIONS

International Search Report and Written Opinion corresponding to PCT International Appln. No. PCT/EP2021/079074, dated Feb. 3, 2022.

(Continued)

*Primary Examiner* — Kevin M Cunningham
(74) *Attorney, Agent, or Firm* — Robert P. Michal, Esq.; Rimon PC

(57) ABSTRACT

Systems, methods, apparatuses, and computer program products for maximum permissible exposure (MPE) uplink (UL) budget prioritization for physical uplink control channel (PUCCH) and physical uplink shared channel (PUSCH) are provided. For example, with a restricted UL power budget under MPE event duration, the user equipment (UE) may prioritize the transmissions of control signals (e.g., PUCCH, medium access control control element (MAC CE), or PUSCH carrying measurement report only) over PUSCH carrying UL user plane traffic.

1 Claim, 6 Drawing Sheets

(56) References Cited

U.S. PATENT DOCUMENTS

| | | | | |
|---|---|---|---|---|
| 2021/0175919 | A1* | 6/2021 | Badic | H04W 72/51 |
| 2021/0297959 | A1* | 9/2021 | Zhou | H04W 72/0453 |
| 2022/0124642 | A1* | 4/2022 | Xu | H04B 17/102 |
| 2023/0035862 | A1* | 2/2023 | Yuan | H04W 52/367 |

FOREIGN PATENT DOCUMENTS

| | | | |
|---|---|---|---|
| IN | 202047015095 | A | 5/2020 |
| WO | 2015196439 | A1 | 12/2015 |
| WO | 2017218749 | A1 | 12/2017 |
| WO | 2020040911 | A1 | 2/2020 |

OTHER PUBLICATIONS

Nokia et al., "Finalization of UE FR2 MPE P-MPR reporting", 3GPP TSG-RAN WG2 Meeting #111 Electronic, Elbonia, Aug. 17-28, 2020, R2-2007375, 8 pages.

Nokia et al., "Introduction of FR2 MPE P-MPR reporting", 3GPP TSG-RAN WG2 Meeting #111 Electronic, Elbonia, Aug. 17-28, 2020, R2-2007376, 4 pages.

Nokia et al., "Introduction of FR2 MPE P-MPR reporting", 3GPP TSG-RAN WG2 Meeting #111 Electronic, Elbonia, Aug. 17-28, 2020, R2-2007377, 11 pages.

Nokia et al., "Introduction of FR2 MPE P-MPR reporting", 3GPP TSG-RAN WG2 Meeting #111 Electronic, Elbonia, Aug. 17-28, 2020, R2-2007378, 17 pages.

Nokia et al., "Introduction of FR2 MPE P-MPR reporting", 3GPP TSG-RAN WG2 Meeting #111 Electronic, Elbonia, Aug. 17-28, 2020, R2-2007379, 4 pages.

Petri Vasenkari, "LS on MPE enhancements", 3GPP TSG RAN WG2#111-e, Online meeting, Aug. 17-28, 2020, R2-2008571, 2 pages.

The First Office Action and Search Report dated May 20, 2025, in corresponding Chinese Patent Application No. 202180074459.4, with English translation thereof.

* cited by examiner

| Symbol | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | PUCCH | PUSCH | PUSCH | PUSCH | PUSCH | PUSCH | PUSCH | PUSCH | PUSCH | PUSCH | PUSCH | PUSCH | PUSCH | PUSCH |
| No-MPE (dBm) (mW) | 24 251,2 | 24 251,2 | 24 251,2 | 24 251,2 | 24 251,2 | 24 251,2 | 24 251,2 | 24 251,2 | 24 251,2 | 24 251,2 | 24 251,2 | 24 251,2 | 24 251,2 | 24 251,2 |
| MPE (dBm) (mW) | 21,4 138,0 | 8,0 6,3 | 8,0 6,3 | 8,0 6,3 | 8,0 6,3 | 8,0 6,3 | 8,0 6,3 | 8,0 6,3 | 8,0 6,3 | 8,0 6,3 | 8,0 6,3 | 8,0 6,3 | 8,0 6,3 | 8,0 6,3 |

| Symbol | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | PUCCH | PUSCH | PUSCH | PUSCH | PUSCH | PUSCH | PUSCH | PUSCH | PUSCH | PUSCH | PUSCH | PUSCH | PUSCH | PUSCH |
| No-MPE (dBm) (mW) | 24 251,2 | 24 251,2 | 24 251,2 | 24 251,2 | 24 251,2 | 24 251,2 | 24 251,2 | 24 251,2 | 24 251,2 | 24 251,2 | 24 251,2 | 24 251,2 | 24 251,2 | 24 251,2 |
| MPE (dBm) (mW) | 21,4 138,0 | 18,0 63,1 | 0,0 1,0 | 0,0 1,0 | 0,0 1,0 | 0,0 1,0 | 0,0 1,0 | 0,0 1,0 | 0,0 1,0 | 0,0 1,0 | 0,0 1,0 | 0,0 1,0 | 0,0 1,0 | 0,0 1,0 |

MAXIMUM PERMISSIBLE EXPOSURE (MPE) UPLINK (UL) BUDGET PRIORITIZATION FOR PHYSICAL UPLINK CONTROL CHANNEL (PUCCH) AND PHYSICAL UPLINK SHARED CHANNEL (PUSCH)

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for maximum permissible exposure (MPE) uplink (UL) budget prioritization for physical uplink control channel (PUCCH) and physical uplink shared channel (PUSCH).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include receiving a configuration of at least two rules associated with applying power back off to an uplink transmission. The at least two rules may include at least one rule for a maximum permissible exposure event and at least one rule for a non-maximum permissible exposure event. The at least one rule for the maximum permissible exposure event may differentiate between control plane traffic and user plane traffic and may prioritize the control plane traffic over the user plane traffic. The method may include detecting the maximum permissible exposure event. The method may include applying, to the uplink transmission, the at least one rule for the maximum permissible exposure event.

In a variant, the method may further include transmitting the uplink transmission to a network node. In a variant, the uplink transmission may include reporting of the maximum permissible exposure event. In a variant, the method may include receiving, from the network node, an indication to change power distributions after transmitting the reporting. In a variant, the at least one rule for the non-maximum permissible exposure event may be associated with causing the user equipment to continue with the uplink transmission without applying the power back-off due to the maximum permissible exposure event. In a variant, the at least one rule for the maximum permissible exposure event may be configured by a network node.

In a variant, the at least one rule for the maximum permissible exposure event may indicate a power distribution for the control plane traffic and the user plane traffic of the uplink transmission when the maximum permissible exposure event occurs. In a variant, the at least one rule for the maximum permissible exposure event may provide different power distributions for different power management-maximum power reduction values or for different groups of power management-maximum power reduction values. In a variant, the detecting may include detecting a user or object in proximity of an antenna of the user equipment, and determining that the detected user or object is within a threshold distance of the antenna.

In a variant, the applying may include prioritizing a physical uplink control channel, and using a scheduling request within the physical uplink control channel to activate or deactivate a power distribution scheme for the maximum permissible exposure event. In a variant, the applying may include re-prioritizing a physical uplink shared channel according to a payload for the maximum permissible exposure event.

In a variant, the applying may include allocating power to at least one of: at least one physical uplink shared channel transmission, at least one physical uplink control channel transmission, at least one physical random access channel transmission, or at least one sounding reference signal transmission. In a variant, the allocating may include allocating the power to at least one of: the at least one physical random access channel transmission on a primary cell, the at least one physical uplink control channel transmission with a hybrid automatic repeat request-acknowledgement or scheduling request information according to a power management-maximum power reduction level, the at least one physical uplink shared channel transmission with power head room or measurement reporting information according to the power management-maximum power reduction level, the at least one sounding reference signal transmission with aperiodic sounding reference signal having a higher priority than semi-persistent or periodic sounding reference signal or the at least one physical random access channel transmission on a serving cell other than the primary cell, the at least one physical uplink control channel transmission with channel state information or the at least one physical uplink shared channel transmission with the channel state information, and the at least one physical uplink shared channel transmission without the hybrid automatic repeat request-acknowledgement information or the channel state information.

In a variant, the applying may include prioritizing at least one logical channel according to a priority for: a cell radio network temporary identifier medium access control control element or data from an uplink common control channel, a single entry power head room medium access control control element or a multiple entry power head room medium access control control element, a configured grant confirmation medium access control control element, a medium access control control element for a buffer status report except for a buffer status report included for padding, data from the at least one logical channel except data from the uplink common control channel, a medium access control control element for recommended bit rate query, and a medium access control control element for the buffer status report included for padding.

In a variant, the method may include applying a power distribution during the maximum permissible exposure event according to a severity of the maximum permissible event. In a variant, the severity of the maximum permissible exposure event may be indicated by a reported power management-maximum power reduction.

A second embodiment may be directed to an apparatus including at least one processor and at least one memory comprising computer program code. The at least one memory and computer program code may be configured, with the at least one processor, to cause the apparatus at least to perform the method according to the first embodiment, or any of the variants discussed above.

A third embodiment may be directed to an apparatus that may include circuitry configured to cause the apparatus to perform the method according to the first embodiment, or any of the variants discussed above.

A fourth embodiment may be directed to an apparatus that may include means for performing the method according to the first embodiment, or any of the variants discussed above. Examples of the means may include one or more processors, memory, and/or computer program codes for causing the performance of the operation.

A fifth embodiment may be directed to a computer readable medium comprising program instructions stored thereon for causing an apparatus to perform at least the method according to the first embodiment, or any of the variants discussed above.

A sixth embodiment may be directed to a computer program product encoding instructions for causing an apparatus to perform at least the method according to the first embodiment, or any of the variants discussed above.

BRIEF DESCRIPTION OF THE DRAWINGS

For proper understanding of example embodiments, reference should be made to the accompanying drawings, wherein.

DETAILED DESCRIPTION

Figure 1:
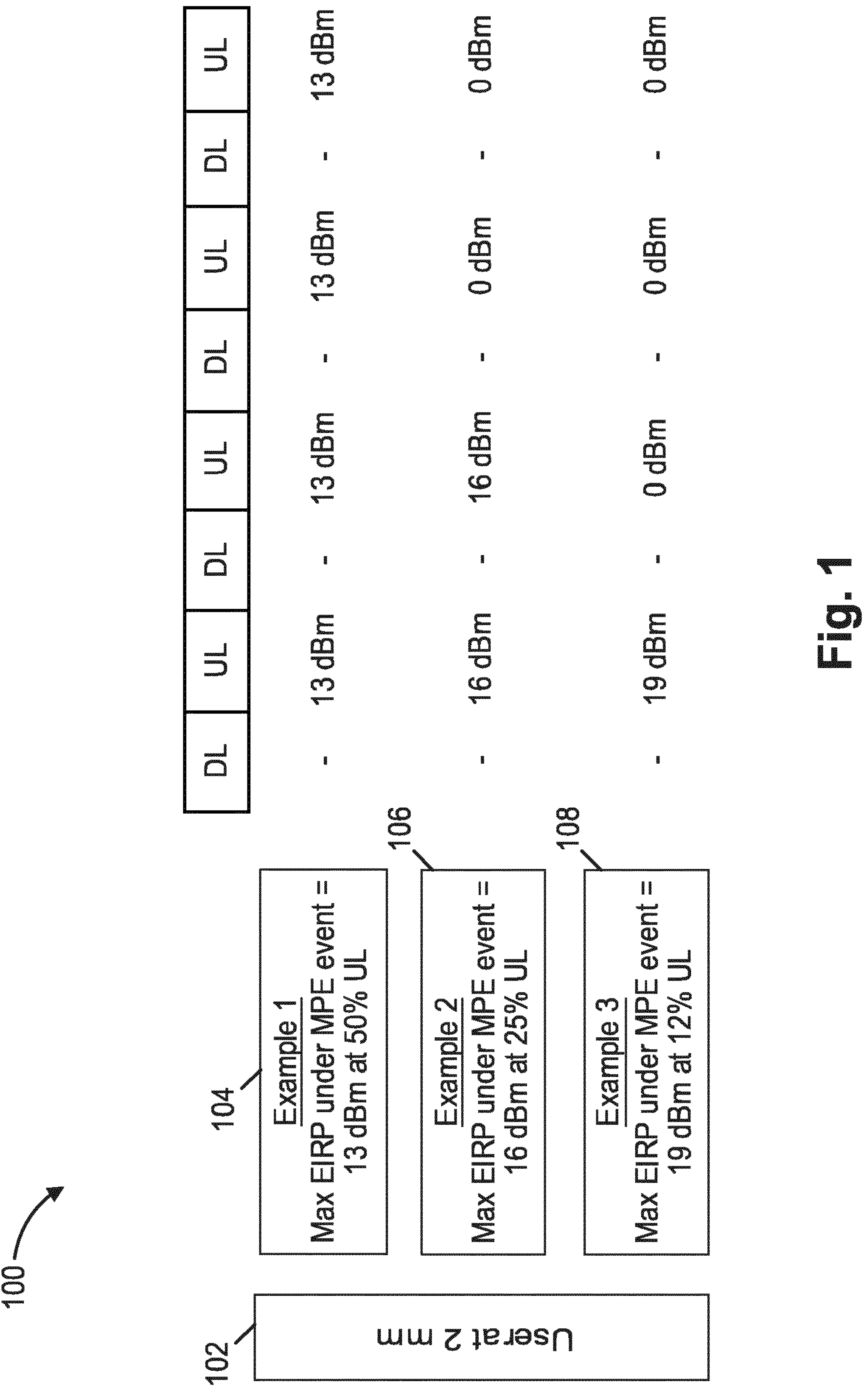
FIG. 1 illustrates an example of maximum allowed effective isotropic radiated power (EIRP) averaged during an MPE event, depending on UE UL scheduling, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for maximum permissible exposure (MPE) uplink (UL) budget prioritization for physical uplink control channel (PUCCH) and physical uplink shared channel (PUSCH) is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Exposure guidelines may be in place to prevent health issues due to thermal effects. The MPE may relate to the regulation of power density for millimeter wave (mmWave) scenarios. For example, a threshold for MPE may be set at 10 Watts per meter squared (W/m$^2$). For a certain distance separating the human tissue from the antenna, a power back-off (PBO) may have to be used for compliance with MPE. However, the PBO may be large (e.g., up to 30 decibels (dB) for devices transmitting at the maximum EIRP limit of, for example, 43 decibel milliwatts (dBm) for ProSe 3 (PC3) UEs) and may cause radio link failures (RLFs) because this back-off may degrade uplink communications such that the maximum number of radio link control (RLC) retransmissions may be reached.

PBO may be triggered at different user-antenna separations, which may depend on the EIRP. For example, a 4×1 array exhibiting an EIRP of 34 dBm (23 dBm maximum power amplifier (PA) output power and 11 dB array gain) may have to use a PBO when a user is located less than, for example, 14 centimeters (cm) away from the antenna. When the user is nearly touching the antenna (e.g., a 2 millimeter (mm) or less separation), the maximum allowed EIRP may be just 10 dBm. As such, the power may have to be backed-off by, for example, 24 dB. The UE range may be significantly impacted by PBO, and a 20 dB PBO may reduce the UE range by, for example, 90 percent (%). PBO applies to UL, and may result in link imbalance when the UE is in power limitation. Even if a close body does not block the propagation (where neither uplink nor downlink path losses are affected), the PBO may reduce transmit power of a UE, which is in power limitation or close to it (e.g., for cell edge UEs, in non-line-of-sight (NLOS) scenarios, etc.). This may reduce the power received by a gNB and consequently the uplink signal-to-interference noise ratio (SINR) as well.

If a close body blocks the propagation as well, there may be a similar imbalance when the UE is operating with power limitation. In this case, both uplink and downlink path losses may be affected (e.g., equally), however, uplink transmit power may have to be further reduced due to MPE restriction.

The frequent and unpredictable nature of PBOs (e.g., up to 20 dB for current PC3 UEs and up to 30 dB for UEs with larger array gain) may be a major concern for the link budget. As a gNB may not be ready to handle a drop in UL conditions, there may not be a significant risk of RLFs. A PBO may be UE and/or operation mode-specific and may not be known at the gNB if not communicated from the UE. Ordinarily, when an MPE event is detected, the UE may limit UL transmissions to the maximum allowed EIRP. If the UE has a high-end proximity sensor that can accurately detect the user distance from the UE, then the UE may apply a dynamic back-off, otherwise the UE may apply the maximum power back-off on the UL transmission slots when it detects a user in the vicinity of the antenna. For MPE events, the averaging window for MPE compliance may be a running window and may be pre-configured. As a result, a peak EIPR value may be averaged over the duty-cycle of the transmission time.

Excessively reducing the output power in 5G (mmW spectrum and directive links, such as frequency range 2 (FR2) and beyond) may be likely to lead to losing a connection to a base station. Since this scenario might already happen when the user is located at less than 14 cm from the UE (and even further for larger than 2×2 arrays), RLFs due to MPE might happen frequently and unpredictably. When the user touches an array (e.g., at a 2 mm or less separation between a user and antenna element), the maximum EIRP may be limited to a maximum of 10 dBm (full duty-cycle) (e.g., in a scenario with a 1×4 antenna array operating with maximum PA power at an EIRP of 34 dBm). The UE may reduce its output power to be compliant with certain restrictions. For example, the UL/downlink (DL) scheduling may be equally split and, therefore, the UE might be able to transmit at 13 dBm. This drop of 20 dB in UL power may fall below the gNB sensitivity. Hence, the UL connection to the gNB may be lost and may cause an RLF.

From the above, it can be understood that there may be issues related to how to signal MPE indication to the gNB if the UE cannot transmit with high enough power for the gNB to decode the message. For power limited UEs, the MPE message may be lost and the network may not be informed of the MPE event. Because of this, the UE may disappear from the network's viewpoint, resulting in a possible RLF or connection release. The gNB may configure PUSCH with a high priority, nonetheless the categorization of PUSCH according to payload may not take MPE into account. This may result in issues of a sudden and dramatic UL degradation, which may lead to a failure in transmitting the MPE indication to the serving cell and in issues of an RLF caused by the user touching the antenna.

Some embodiments described herein may provide for MPE UL budget prioritization for PUCCH and PUSCH. For example, with a restricted UL power budget under MPE event duration, the UE may prioritize the transmissions of control signals (e.g., PUCCH, medium access control control element (MAC CE), or PUSCH carrying a measurement report) over PUSCH carrying UL user plane traffic. The prioritization may help to ensure that the UE has enough power to inform a network node (e.g., a gNB) about MPE events and/or about neighbor cell measurements for redirecting the link.

FIG. 1 illustrates an example 100 of maximum allowed EIRP averaged during an MPE event, depending on UE UL scheduling, according to some embodiments. This may illustrate an example of UE transmit (Tx) power budget prioritization, where the UL Tx power allowed under MPE events scales with the UL scheduling. Depending on the UL scheduling (using UL duty cycle and/or slot format), the UE may increase the power in some slots and/or symbols to help ensure successful decoding by the network node at the expense of other slots and/or symbols.

As illustrated at 102, a user may be located 2 mm from an antenna of a UE, which may be detected by the UE through one or more various sensors of the UE. Three examples, e.g., at 104, 106, and 108, respectively, are illustrated in FIG. 1. As illustrated in these three examples, with UL scheduling reduced from 100% to 25%, the allowed UE Tx power under an MPE event with a user located at 2 mm away from the transmitting array can be increased from 13 dBm with 50% UL scheduling to 19 dBm with 25% UL scheduling, in a 50% UL and 50% DL slot format.

In certain embodiments, dedicated scheduling request (SR) resources on PUCCH can be configured, by a network node, for the UE to provide physical layer indication about an MPE event. The priority rules may be utilized according to different scenarios. For example, the UE may apply at least two priority rule configurations where at least one corresponds to non-MPE events and at least one another corresponds to MPE events. The priority rule corresponding to non-MPE event may include continuing a UL transmission without applying PBO following UL prioritization for non-MPE profile. The priority rule corresponding to MPE events may differentiate between PUSCH carrying a control signal, such as a measurement report, or PUSCH carrying user plane data. Additionally, or alternatively, the priority rule corresponding to the MPE event may be pre-configured by the network and may indicate the power distribution that the UE should apply in the case of an MPE event causing a power management—maximum power reduction (P-MPR). Different power distributions may be provided for different P-MPR values or for different groups of P-MPR values. The serving cell may indicate to the UE to switch to another power distribution after receiving, for instance, a first MPE indication. The UE may report MPE events with a certain number of bits, such as 2 bits ranging from 3 dB to 12 dB. For example, if the MPE event is triggered with P-MPR 3 dB<P-MPR<6 dB for a UE in good signal conditions, the UE may a prioritize power headroom (PHR) MAC CE for successful reporting of P-MPR (included in PHR). This may allow the network to monitor the severity of the MPE event and adjust accordingly. As another example, if the MPE event is triggered for a power limited UE and/or with P-MPR>12 dB, the UE may prioritize PUSCH carrying a measurement report in order for the network to redirect the link successfully and faster than what would otherwise be possible.

As described above, FIG. 1 is provided as an example. Other examples are possible, according to some embodiments.

Figure 2:
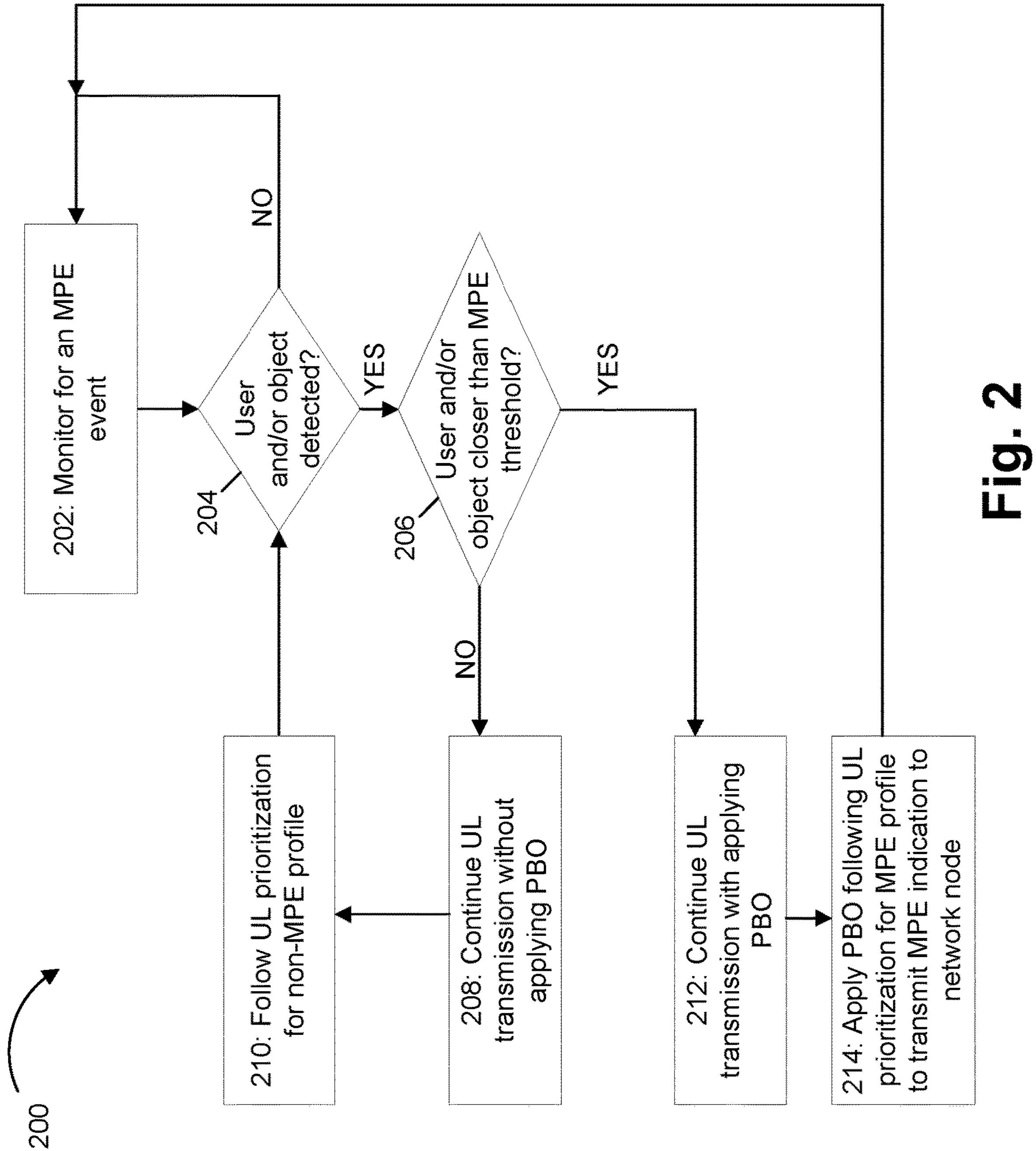
FIG. 2 illustrates an example of UE operations, according to some embodiments.

FIG. 2 illustrates an example 200 of UE operations, according to some embodiments. For example, FIG. 2 illustrates utilization of prioritization rules for MPE and non-MPE events. As illustrated at 202, the UE may monitor for an MPE event. For example, the UE may monitor for whether a user and/or an object is in proximity of an antenna of the UE (e.g., may monitor continuously, periodically, etc.). The monitoring may be performed using sensors of the UE. As illustrated at 204, the UE may determine whether a user and/or an object is detected. If the UE determines that a user and/or an object is not detected (204—NO), then the UE may continue to monitor for the MPE event. If the UE determines that a user and/or an object is detected (204—YES), then the UE may, at 206, determine whether the user and/or the object are closer than an MPE threshold. For example, the UE may determine whether the user and/or the object are within a threshold distance from an antenna of the UE. If the UE determines that the user and/or the object are not closer than the MPE threshold (206—NO), then the UE may, at 208, continue a UL transmission without applying PBO (e.g., may continue the UL transmission with UE Tx power controlled by UE power control equations). The UE may, at 210, follow UL prioritization for non-MPE profile in continuing the UL transmission. After performing the operations at 210, the UE may return to the operations at 204.

If the UE determines that the user and/or the object are closer than the MPE threshold (206—YES), then the UE may, at 212, continue UL transmission with applying PBO. The UE may then, at 214, apply PBO following UL prioritization for MPE profile to transmit an MPE indication to a network node.

In this way, certain embodiments may utilize dedicated SR resource for activating or deactivating the MPE related priority rule configuration while also indicating the MPE event to the network node. In addition, triggered MPE events may have a different UE UL Tx power configuration. For example, there may be at least two priority rule configurations where at least one corresponds to a non-MPE event and at least one other rule corresponds to an MPE event. With respect to the at least one other rule that corresponds to the MPE event, the UE may differentiate between PUSCH carrying a measurement report (e.g., control plane traffic) and PUSCH carrying user plane traffic. Additionally, or alternatively, the UE may prioritize control traffic on the PUSCH over user traffic on the PUSCH.

As indicated above, FIG. 2 is provided as an example. Other examples are possible, according to some embodiments.

According to certain embodiments, the UE can prioritize the power that it sends per symbol to help ensure that signalling of the MPE event is successfully transmitted to the network, as well as PUSCH control signals containing, for example, measurement reports. As a result, the PUSCH user plane traffic may be de-prioritized. In this way, the UE may adjust its UL power taking MPE conditions into account, in order to prioritize the signalling that may be important to the network. Certain embodiments may provide for the UE Tx power distribution during an MPE event, which may help ensure that the UE can signal MPE messages to the network (e.g., P-MPR within PHR) as well as critical signalling to maintain the link and to avoid a radio link failure caused by high P-MPR due to MPE (e.g., intra/inter-cell measurement reports). The UE Tx power distribution priorities may be provided for different P-MPR values or for different groups of P-MPR values.

In certain embodiments, the UE may prioritize PUCCH and/or may use SR within PUCCH to activate or deactivate the MPE power distribution scheme. The UE Tx power distribution during MPE for PUCCH and PUSCH may follow the scheme illustrated in the table 300 of FIG. 3, where PUCCH signalling is illustrated at 302 and PUSCH signalling is illustrated at 304. This scheme may help ensure MPE signalling to a network in PUCCH. In this scheme, the UE may send a SR in PUCCH. The UE may perform this transmission to request PHR resources, in which it may send a P-MPR value. Additionally, or alternatively, the UE may perform this transmission to activate or deactivate MPE power distribution (which may prioritize PUSCH according to payload).

Figure 4:
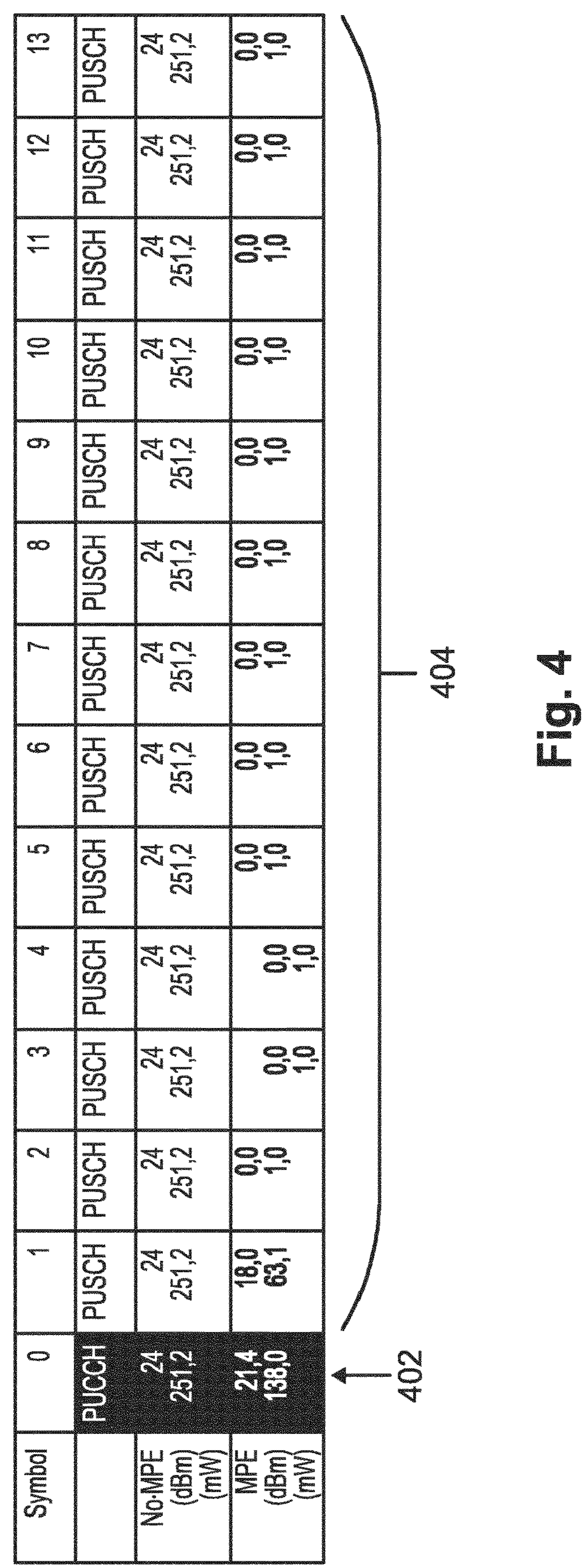
FIG. 4 illustrates an example table of another MPE power distribution scheme, according to some embodiments.

In certain embodiments, the UE may prioritize the PUSCH according to payload specifically for MPE. An example of this scheme is illustrated in the table 400 of FIG. 4, where PUCCH signalling is illustrated at 402 and PUSCH signalling is illustrated at 404. This scheme may help to ensure MPE signalling to a network in PUCCH and PUSCH carrying control traffic. For example, PHR may contain 16 bits (2 bits for MPE P-MPR value and 6 bits for each power headroom (PH) and Pcmax fields). Therefore, PHR (including P-MPR values) may be sent with 1 symbol, adapting the modulation and the number of allocated resource elements. For example, in 64-quadrature amplitude modulation (QAM) there may be 6 bits per symbols per resource element, and PHR may be transmitted with 1 symbol (e.g., over a wider bandwidth).

The values provided in example tables 300 and 440 are just some examples for purposes of illustration. Accordingly, the example embodiments described herein are not limited to the values provided therein, and other examples are possible.

According to certain embodiments, PUSCH can be differentially prioritized according to payload based on MPE events. In an embodiment, the UE experiencing an MPE event may allocate power to PUSCH, PUCCH, physical random access channel (PRACH), and/or sounding reference signal (SRS) transmissions according to the following priority order (in descending order): PRACH transmissions on a primary cell (PCell), PUCCH transmissions with hybrid automatic request (HARQ)-acknowledgement (ACK) or SR information according to a P-MPR level, PUSCH transmissions with PHR or measurement reporting information according to P-MPR level, SRS transmission, with aperiodic SRS having a higher priority than semi-persistent and/or periodic SRS, or PRACH transmission on a serving cell other than the PCell, PUCCH transmissions with channel state information (CSI) or PUSCH with CSI, and/or PUSCH transmissions without HARQ-ACK information or CSI. This prioritization may be such that the total UE transmit power for transmissions on serving cells in the frequency range is smaller than or equal to a Pcmax(i) value for that frequency range in symbols of transmission occasion i. In this way, certain embodiments may provide for UL power prioritization for MPE conditions, P-MPR discrimination, and PHR and measurement reporting prioritization. Additionally, or alternatively, certain embodiments may provide for increasing SRS priority in order to realign UL transmissions.

Certain embodiments may provide for allocation of resources such that PUSCH can be differentially prioritized according to payload under MPE events. For example, certain embodiments may provide for UL power prioritization for MPE condition and/or re-prioritization of PHR. For UEs reporting MPE events, logical channels may be prioritized in accordance with the following order (highest priority listed first): cell radio network temporary identifier (C-RNTI) MAC CE or data from UL-common control channel (CCCH), single entry PHR MAC CE or multiple entry PHR MAC CE, configured grant confirmation MAC CE, MAC CE for buffer status report (BSR) (with exception of BSR included for padding, in certain embodiments), data from any logical channel (except data from UL-CCCH, in certain embodiments), MAC CE for recommended bit rate query, and MAC CE for BSR included for padding.

Table 1 describes an example prioritization for PUCCH and PUSCH according to P-MPR values for MPE event reporting, according to some embodiments. For example, Table 1 may provide example power distribution for UEs during MPE events, according to MPE severity.

TABLE 1

| Reported P-MPR under MPE event | New proposed PUCCH prioritization under MPE event | New proposed PUSCH prioritization under MPE event |
|---|---|---|
| 3 dB < P-MPR < 6 dB | Yes, SR | Yes, PHR |
| 6 dB < P-MPR < 9 dB | Yes, SR | Yes, PHR |
| 9 dB < P-MPR < 12 dB | Yes, HARQ-ACK* or SR** | Yes, Measurement reports (L1 and/or L3***) |
| P-MPR > 12 dB | Yes, HARQ-ACK* or SR** | Yes, Measurement reports (L1 and/or L3***) |

In Table 1, certain values are denoted by with a "*" indicator. In certain embodiments, if the MPE event has been reported with increasing severity (e.g., a first MPE event with 3 dB<P-MPR<6 dB and then P-MPR reporting with larger values when the user is approaching towards the active array), the network node may already have scheduled UL resources for measurement reports when the UE reports P-MPR>9 dB. Prioritizing SR in PUCCH to send the measurement reports may not be performed since UL resources have already been allocated by the network. In these cases, prioritizing ACK/negative ACK (NACK) may be more important, in order for the network node to know that even though UL data may be lost, DL data can still be received by the UE.

Certain values in Table 1 are denoted with a "*" indicator. In certain embodiments, if the MPE event is reported for the first time with a high P-MPR value, e.g., P-MPR>12 dB (e.g., the user's fingers slid onto the active array causing maximum power back-off immediately or if the UE has a static maximum power back-off operation regardless of the user distance), the network node may not have been previously informed of the MPE event. As such, if there are no scheduled UL resources on which to send measurement reports, the UE may have to prioritize SR to send measurement reports in PUSCH.

Certain values of Table 1 are denoted with a "**" indicator. In certain embodiments, layer 1 (L1) and layer 3 (L3) of the UE may report on both intra-cell beam management and inter-cell mobility.

Figure 5:
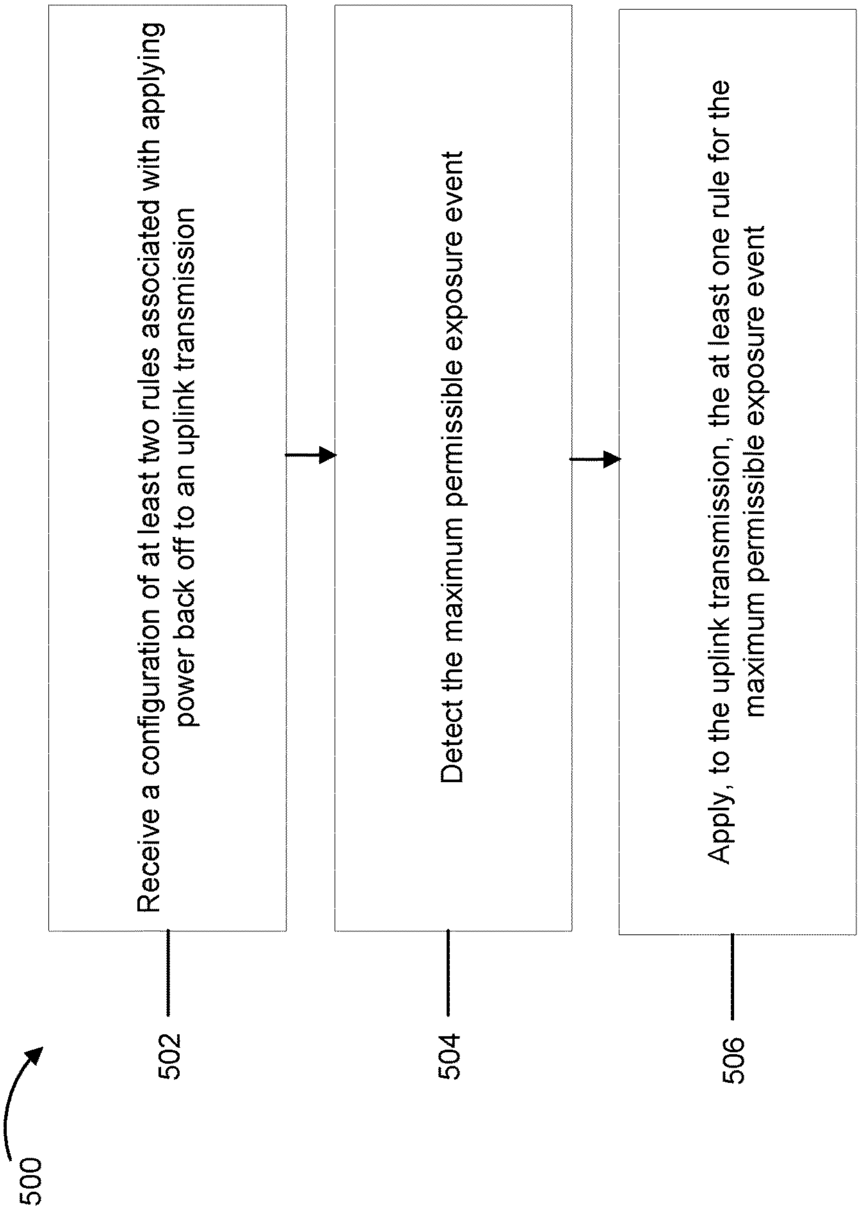
FIG. 5 illustrates an example flow diagram of a method, according to some embodiments.

FIG. 5 illustrates an example flow diagram of a method 500, according to some embodiments. For example, FIG. 5 may illustrate example operations of a UE (e.g., apparatus 20 illustrated in, and described with respect to, FIG. 6*b*). Some of the operations illustrated in FIG. 5 may be similar to some operations shown in, and described with respect to, FIGS. 1-4.

In an embodiment, the method may include, at 502, receiving a configuration of at least two rules associated with applying power back off to an uplink transmission. The at least two rules may include at least one rule for a maximum permissible exposure event and at least one rule for a non-maximum permissible exposure event. The at least one rule for the maximum permissible exposure event may differentiate between control plane traffic and user plane traffic and may prioritize the control plane traffic over the user plane traffic. The method may include, at 504, detecting the maximum permissible exposure event, for example, in a manner similar to that described at 204 and/or 206 of FIG. 2. The method may include, at 506, applying, to the uplink transmission, the at least one rule for the maximum permissible exposure event, for example, in a manner similar to that at 212 and/or 214 of FIG. 2.

The method illustrated in FIG. 5 may include one or more additional aspects described below or elsewhere herein. In some embodiments, the method may further include transmitting the uplink transmission to a network node. The uplink transmission may include reporting of the maximum permissible exposure event. In some embodiments, the method may include receiving, from the network node, an indication to change power distributions after transmitting the reporting. In some embodiments, the at least one rule for the non-maximum permissible exposure event may be associated with causing the user equipment to continue with the uplink transmission without applying the power back-off due to the maximum permissible exposure event, for example, in a manner similar to that described at 208 and/or 210 of FIG. 2. For example, this may allow application of a non-MPE profile if the UE uses P-MPR for, e.g., overheating, carrier aggregation (CA), etc. In some embodiments, the at least one rule for the maximum permissible exposure event may be configured by a network node.

In some embodiments, the at least one rule for the maximum permissible exposure event may indicate a power distribution for the control plane traffic and the user plane traffic of the uplink transmission when the maximum permissible exposure event occurs. In some embodiments, the at least one rule for the maximum permissible exposure event may provide different power distributions for different power management-maximum power reduction values or for different groups of power management-maximum power reduction values. In some embodiments, the detecting at 504 may include detecting a user or object in proximity of an antenna of the user equipment (e.g., in a manner similar to that at 204 of FIG. 2), and determining that the detected user or object is within a threshold distance of the antenna (e.g., in a manner similar to that at 206 of FIG. 2).

Figure 3:
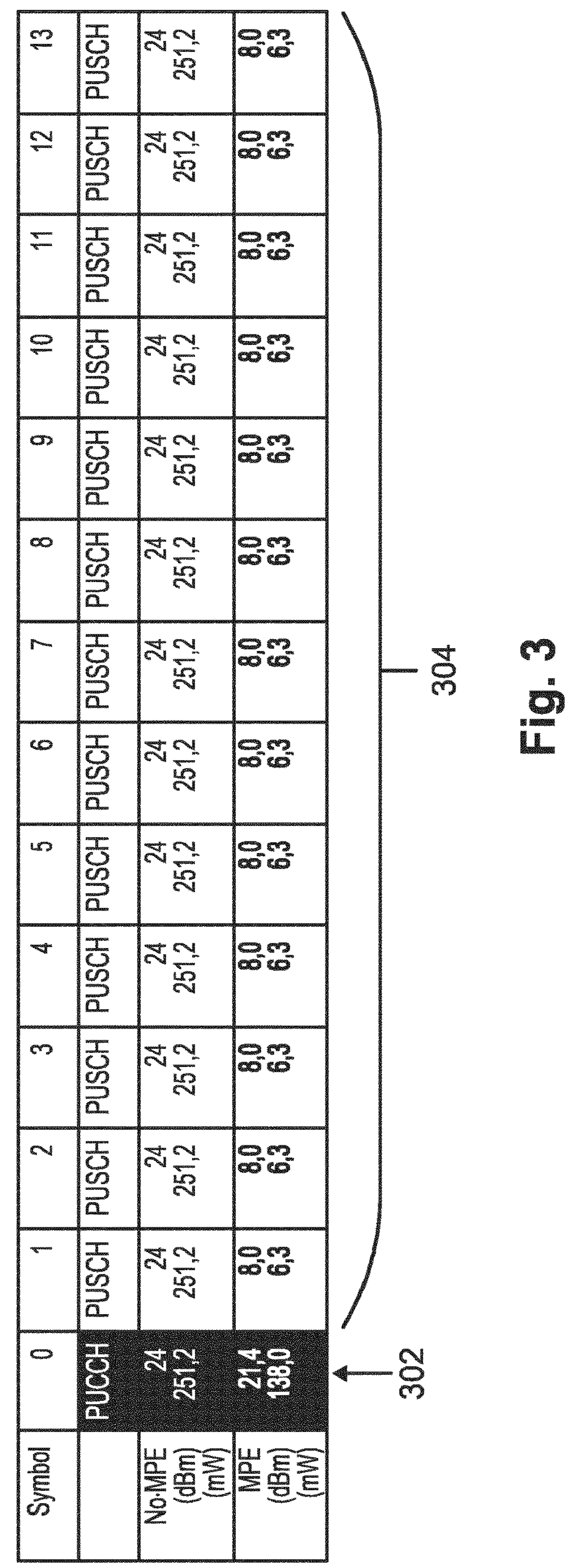
FIG. 3 illustrates an example table of an MPE power distribution scheme, according to some embodiments.

In some embodiments, the applying at 506 may include prioritizing a physical uplink control channel, and using a scheduling request within the physical uplink control channel to activate or deactivate a power distribution scheme for the maximum permissible exposure event, for example, in a manner similar to that illustrated in, and described with respect to, FIG. 3. In some embodiments, the applying at 506 may include re-prioritizing a physical uplink shared channel according to a payload for the maximum permissible exposure event, for example, in a manner similar to that illustrated in, and described with respect to, FIG. 4.

In some embodiments, the applying at 506 may include allocating power to at least one of: at least one physical uplink shared channel transmission, at least one physical uplink control channel transmission, at least one physical random access channel transmission, or at least one sounding reference signal transmission. In some embodiments, the allocating at 506 may include allocating the power to at least one of: the at least one physical random access channel transmission on a primary cell, the at least one physical uplink control channel transmission with a hybrid automatic repeat request-acknowledgement or scheduling request information according to a power management-maximum power reduction level, the at least one physical uplink shared channel transmission with power head room or measurement reporting information according to the power management-maximum power reduction level, the at least one sounding reference signal transmission with aperiodic sounding reference signal having a higher priority than semi-persistent or periodic sounding reference signal or the at least one physical random access channel transmission on a serving cell other than the primary cell, the at least one physical uplink control channel transmission with channel state information or the at least one physical uplink shared channel transmission with the channel state information, and the at least one physical uplink shared channel transmission without the hybrid automatic repeat request-acknowledgement information or the channel state information.

In some embodiments, the applying at 506 may include prioritizing at least one logical channel according to a priority for: a cell radio network temporary identifier medium access control control element or data from an uplink common control channel, a single entry power head room medium access control control element or a multiple entry power head room medium access control control element, a configured grant confirmation medium access control control element, a medium access control control element for a buffer status report except for a buffer status report included for padding, data from the at least one logical channel except data from the uplink common control channel, a medium access control control element for recommended bit rate query, and a medium access control control element for the buffer status report included for padding.

In some embodiments, the method may include applying a power distribution during the maximum permissible exposure event according to a severity of the maximum permissible event. In some embodiments, the severity of the maximum permissible exposure event may be indicated by a reported power management-maximum power reduction.

As described above, FIG. 5 is provided as an example. Other examples are possible according to some embodiments.

Figures 6A, 6B:
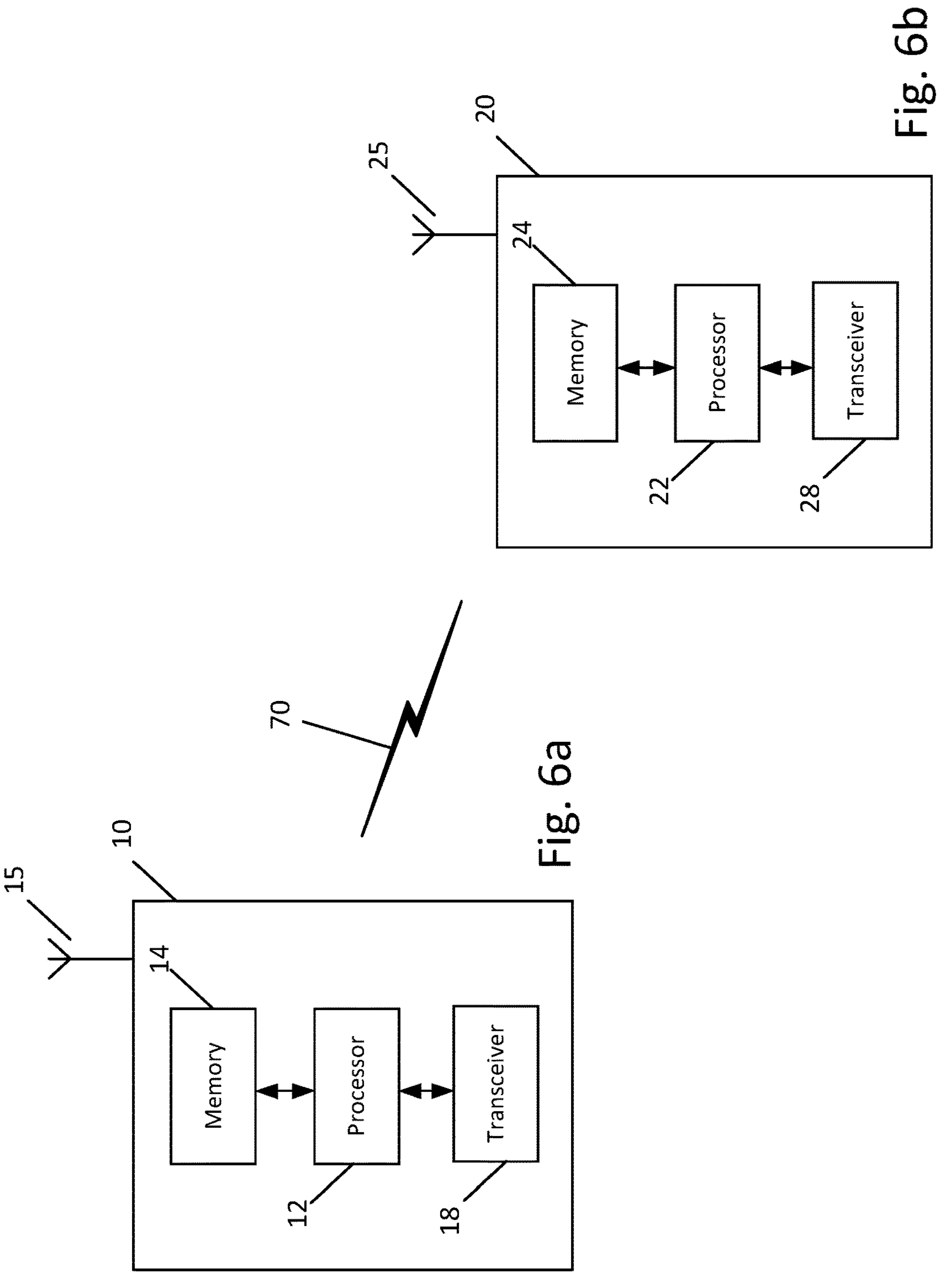
FIG. 6*a* illustrates an example block diagram of an apparatus, according to an embodiment.
FIG. 6*b* illustrates an example block diagram of an apparatus, according to another embodiment.

FIG. 6*a* illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6*a*.

As illustrated in the example of FIG. 6*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-4.

FIG. 6*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6*b*.

As illustrated in the example of FIG. 6*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-5. For instance, in one embodiment, apparatus 20 may be controlled by memory 24 and processor 22 to perform the method of FIG. 5.

In some embodiments, an apparatus (e.g., apparatus 10 and/or apparatus 20) may include means for performing a method or any of the variants discussed herein, e.g., a method described with reference to FIG. 5. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is helping to ensure that PHR and/or measurement reports are prioritized under MPE events. Additionally, or alternatively, other benefits of some example embodiments are utilization of PHR (including MPE P-MPR) prioritization for low values of P-MPR to help ensure that a network node quickly receives the newest P-MPR report and/or utilization of measurement report prioritization for high values of P-MPR to help ensure that the network can redirect a beam to another beam pair (from the same network node or a handover). Additionally, or alternatively, other benefits of some embodiments include providing the network with knowledge of how the UE prioritizes its logical channels under MPE events and/or providing the network with relevant information to serve UEs during MPE events and avoiding losing a communications link. Accordingly, the use of some example embodiments results in improved functioning of communications networks and their nodes and, therefore constitute an improvement at least to the technological field of handling of MPE events, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

ACK Acknowledgement
HARQ Hybrid Automatic Repeat Request
MPE Maximum Permissible Exposure
PBO Power Back Off
PHR Power Headroom Report
P-MPR Power Management—Maximum Power Reduction
PUCCH Physical Uplink Control Channel
PUSCH Physical Uplink Shared Channel
SR Scheduling Request

The invention claimed is:

1. A user equipment (UE) method, comprising:
at least one processor; and
at least one memory, including instructions stored thereon, which when executed by the at least one processor cause the UE to perform operations at least including:
receiving, by the UE, a configuration of at least two rules associated with
applying power back off to an uplink transmission, wherein the at least two rules comprise at least one rule for a maximum permissible exposure event and at least one rule for a non-maximum permissible exposure event, wherein the at least one rule for the maximum permissible exposure event differentiates between control plane traffic and user plane traffic and prioritizes the control plane traffic over the user plane traffic, wherein the at least one rule for the non-maximum permissible exposure event is associated with causing the UE to continue with the uplink transmission without applying the power backoff due to the maximum permissible exposure event, wherein the at least one rule for the maximum permissible exposure event is configured by a network node, wherein the at least one rule for the maximum permissible exposure event indicates a power distribution for the control plane traffic and the user plane traffic of the uplink transmission when the maximum permissible exposure event occurs, and wherein the at least one rule for the maximum permissible exposure event provides different power distributions for different power management-maximum power reduction values or for different groups of power management-maximum power reduction values;
detecting the maximum permissible exposure event;
applying, to the uplink transmission, the at least one rule for the maximum permissible exposure event detecting a user or object in proximity of an antenna of the user equipment, wherein the applying of the at least one rule for the maximum permissible exposure event further comprises allocating power to:
at least one physical uplink shared channel transmission,
at least one physical uplink control channel transmission,
at least one physical random access channel transmission, and
at least one sounding reference signal transmission, and
wherein the allocating of the power further comprises allocating the power to:
the at least one physical random access channel transmission on a primary cell,
the at least one physical uplink control channel transmission with a hybrid automatic repeat request-acknowledgement or scheduling request information according to a power management-maximum power reduction level,
the at least one physical uplink shared channel transmission with power head room or measurement reporting information according to the power management-maximum power reduction level,
the at least one sounding reference signal transmission with aperiodic sounding reference signal having a higher priority than semi-persistent or periodic sounding reference signal or the at least one physical random access channel transmission on a serving cell other than the primary cell,
the at least one physical uplink control channel transmission with channel state information or the at least one physical uplink shared channel transmission with the channel state information, and
the at least one physical uplink shared channel transmission without the hybrid automatic repeat request-acknowledgement information or the channel state information,
wherein the applying of the at least one rule for the maximum permissible exposure event further comprises:
prioritizing a physical uplink control channel; and
using a scheduling request within the physical uplink control channel to activate or deactivate a power distribution scheme for the maximum permissible exposure event,
wherein the applying of the at least one rule for the maximum permissible exposure event further comprises: re-prioritizing a physical uplink shared channel according to a payload for the maximum permissible exposure event;
determining a distance that the detected user or object is from the antenna;

transmitting the uplink transmission to a network node, wherein the uplink transmission comprises reporting of the maximum permissible exposure event; and receiving, from the network node, an indication to change power distributions after transmitting the reporting.

* * * * *